United States Patent [19]

Pizzorno et al.

[11] Patent Number: 4,604,043
[45] Date of Patent: Aug. 5, 1986

[54] EXTRACTOR UNIT FOR TIRE VULCANIZING MOULDS AND DEVICE FOR RAPIDLY DISASSEMBLING IT FROM A VULCANIZING PRESS

[75] Inventors: Augusto Pizzorno, Milan; Bruno Salvadori, Cormano, both of Italy

[73] Assignee: Pirelli Coordinamento Pneumatici S.p.A., Italy

[21] Appl. No.: 787,042

[22] Filed: Oct. 15, 1985

[30] Foreign Application Priority Data

Nov. 7, 1985 [IT] Italy .................. 23481 A/84

[51] Int. Cl.⁴ .............................. B29H 5/02
[52] U.S. Cl. .................... 425/182; 425/33; 425/38; 425/48; 425/28 R
[58] Field of Search ............... 425/28 R, 33, 36, 35, 425/38, 48, 58, 182, 193, 195

[56] References Cited

U.S. PATENT DOCUMENTS

| | | | |
|---|---|---|---|
| 3,097,394 | 7/1963 | Mallory et al. | 425/38 X |
| 3,336,636 | 8/1967 | Soderquist | 425/33 |
| 3,520,024 | 7/1970 | Caretta et al. | 425/38 |
| 3,530,533 | 9/1970 | Turk et al. | 425/38 X |
| 3,584,335 | 6/1971 | Ulm et al. | 425/36 |
| 4,131,402 | 12/1978 | Pirovano | 425/38 |
| 4,365,945 | 12/1982 | Salvadori | 425/38 X |

Primary Examiner—J. Howard Flint, Jr.
Attorney, Agent, or Firm—Stevens, Davis, Miller & Mosher

[57] ABSTRACT

A device for rapidly disassembling an extractor unit from the driving mechanism of a press for vulcanizing pneumatic tires is positioned on the lower part of the open vulcanizing mould, while the extractor unit comprises a body of a substantially annular shape apt to be fixed to a mobile shaft of the vulcanizing press through first connecting means comprising a first set of radial teeth obtained on said shaft and a second set of radial teeth obtained on said body and able to cooperate with said teeth of the first set to block the body with respect to the shaft in consequence of a rotation of the former with respect to the latter; the device comprises also dragging means including a disc which rotates in consequence of the action of a lever, hand operated, said disc is provided with a plurality of stakes whose axis is parallel to the axis of said body, said dragging means being able to cooperate with said extractor unit so that said stakes are inserted into holes of said body to make this latter rotate with respect to said first shaft in consequence of the rotation of said disc so as to release said second set of teeth from said first set of teeth and to separate said extractor unit from said shaft.

17 Claims, 4 Drawing Figures

EXTRACTOR UNIT FOR TIRE VULCANIZING MOULDS AND DEVICE FOR RAPIDLY DISASSEMBLING IT FROM A VULCANIZING PRESS

FIELD OF THE INVENTION

The present invention refers to a device for rapidly disassembling the part of the mould known as "centering extractor unit" from the driving mechanism of a press for vulcanizing pneumatic tires, as well as to the improvements made to said extractor unit in order to permit the use of said device, through which the disassembling and reassembling operations can be carried out in a simple and rapid manner without using tools.

DESCRIPTION

As known, the mould for vulcanizing a pneumatic tire substantially comprises a fixed block that is apt to be connected to the frame of a vulcanizing press, and a mobile block connected to the driving mechanism of the press and movable with respect to said fixed block to allow the mould to be opened and closed; in the presses according to the invention, at the central part of the above said mobile block there is moreover a centering extractor unit which is able to originate the separation of the vulcanized pneumatic tire from the mould blocks during the unloading step of the pneumatic tire from the press.

The above said extractor unit substantially comprises a body of annular shape, apt to be fixed to a mobile shaft of the press driving mechanism and a plurality of laminae radially movable in both directions with respect to said body to be led from a first configuration in which they are housed at the body inside to a second configuration in which they cooperate with the mould mobile block to obtain the blocking of the pneumatic tire bead and vice versa.

The connection between the said extractor unit and the above cited shaft is carried out through first connecting means substantially comprising two sets of radial teeth, those of a first set are obtained on the end of the first above said shaft, while the teeth of the second set are obtained on the annular body and are able to cooperate with the teeth of the other set to block the body with respect to the shaft in consequence of a relative rotation of the former with respect to the latter; moreover devices are arranged in order to prevent the extractor unit from casually becoming unscrewed from said shaft. Said devices are usually constituted by screws, able to prevent the annular body from rotating with respect to the shaft before the above said devices being removed from the seats where they are housed.

The centering extractor unit comprises moreover a centering ogive which axially projects from the body itself and is connected to the above said shaft too; said centering ogive has the purpose of substantially maintaining in a correct position the curing bag, provided in the vulcanizing mould, during the insertion of the bag into the uncured carcass to be vulcanized, at the beginning of a new vulcanizing cycle, and during the inflation of the curing bag and the closing of the mould.

The above said ogive is connected to the same shaft through second connecting means comprising two sets of radial teeth, those of a first set are obtained on the shaft and those of the second set are obtained on the ogive and are able to cooperate with the teeth of the other set to block the ogive with respect to the shaft in consequence of a relative rotation of the former with respect to the latter. In order to prevent the ogive, from casually rotating, also in this case there are provided suitable devices usually constituted by screws apt to allow the rotation of the ogive with respect to the shaft only when said devices have been removed from opportune seats where they are housed.

Usually for disassembling the above described extractor unit from the press, several operations, particular attention and care are required and a considerable long time is taken. In fact, firstly, when the mould has to be disassembled from the press, and also the centering extractor unit has to be disassembled from the driving mechanism, it is necessary to wait for having the press and the various parts of the mould sufficiently cooled so as to substantially assume the room temperature; in fact, the disassembling operations of the extractor unit must be carried out manually by an operator when the mould is open, i.e. when the upper block is lifted said operator gets into between the fixed block and the mobile block of the mould itself. Moreover in order to enable the operator to work with a sufficient safety, said mobile block of the mould must be blocked with respect to the fixed one, through opportune toolings in order to avoid an accidental closing of the mould. Then the operator before unscrewing the ogive and the body of the extractor unit, has to remove the above mentioned devices which are arranged so as to avoid the accidental rotation of said parts; to this purpose it is necessary to act on the head of the above mentioned devices with suitable keys to remove them from their seats. Finally, the operator must operate manually the rotation of the ogive so as to release the teeth of this latter from the corresponding ones of the shaft of the press and, subsequently, to remove the ogive from the extractor unit and consequently to process in the same manner to originate the rotation of the extractor body and its removal from the press.

The present invention aims at realizing a device for rapidly disassembling a centering extractor unit from the driving mechanism of a press for vulcanizing pneumatic tires, and an improved extractor unit to allow the use of said device through which the above mentioned drawbacks can be eliminated and in particular said disassembling operation can be carried out without waiting for the cooling of the mould and the press, without arranging opportune toolings that prevent the mould from accidentally closing and with simple and rapid operations.

Accordingly, the present invention provides a centering extractor unit for pneumatic tire vulcanizing moulds, suitable to be assembled on and operated by the driving mechanism of a press for vulcanizing pneumatic tires, comprising a body having a substantially annular shape suitable to be fixed to a mobile shaft of said driving mechanism, and a plurality of laminae radially movable with respect to said body to be led from a first configuration in which they are housed at said body inside to a second configuration in which they radially project from said body, said connection between the extractor unit and said shaft being effected through first connecting means comprising a first set of radial teeth obtained on said shaft and a second set of radial teeth obtained on said body and able to cooperate with said teeth of the first set to block the body with respect to the shaft in consequence of a relative rotation between said elements, characterized by the fact that said body comprises first blocking means, alternatively and freely movable from a non-interference position to an interference position simultaneously with both said sets of teeth in position of mutual cooperation.

A second object of the present invention is a centering extractor unit for pneumatic tire vulcanizing moulds, suitable to be assembled on and operated by the driving mechanism of a press for vulcanizing pneumatic tires, comprising a centering axially projecting from said body and connected to a mobile shaft of said driving mechanism through second connecting means comprising a first set of radial teeth obtained on said shaft and a second set of radial teeth obtained on said ogive and able to cooperate with said teeth of the first set to block the ogive with respect to the shaft in consequence of a rotation of the ogive with respect to the shaft, characterized by the fact of comprising second blocking means alternatively and freely movable from a non-interference position to an interference position simultaneously with said shaft and said ogive, disposed with said sets of teeth in position of mutual cooperation.

Finally a further object of the present invention is a device for assembling and disassembling a centering extractor unit for pneumatic tire moulds, respectively on and from the driving mechanism of a press for vulcanizing pneumatic tires, characterized by the fact of comprising a platen supported by the frame of said press in correspondence of the lower portion of said mould, coaxially with said press, a first disc axially and freely rotatable with respect to said platen, comprising means for associating with said annular body able to exercise a thrust on said first blocking means to lead them in said non-interference position, and means able to originate the rotation of said annular body around its own axis, a second disc axially and freely rotatable around said platen and said first disc comprising means for connecting with said centering ogive able to exercise a thrust on said second blocking means to lead them in said non-interference position, and means able to originate the rotation of said ogive around its own axis.

According to an advantageous embodiment of the invention, said first blocking means comprise at least an oscillating lever which is suitable for being inserted into a corresponding cut obtained in the teeth of said first and second set of teeth to prevent said bdy from rotating with respect to said shaft, devices being provided for maintaining said lever, freely rotatable around the oscillating center, inside said cut. Said second blocking means comprise then a rod axially movable inside said ogive, a bar hinged to said rod and suitable for being inserted into a pair of slits obtained on said shaft and on said ogive to prevent said ogive from rotating with respect to said shaft, devices being provided to maintain said bar, freely rotatable around a hinged point with said rod, contemporaneously inside said slits.

Therefore it is advantageous that said thrusting means disposed on said device be essentially constituted by stakes suitable to be inserted into corresponding holes on said annular body and said ogive, in consequence, of a relative movement of mutual approaching between said device and said centering extractor unit, and to exercise said thrust, both on said levers and on said bars, giving rise for both to their rotation around the corresponding hinged point and the consequence movement in the non-interference position with the driving shaft.

For better understanding the present invention, one of its particular embodiments will now be described in detail, by way of example, with reference to the attached drawings in which.

Figure 1:
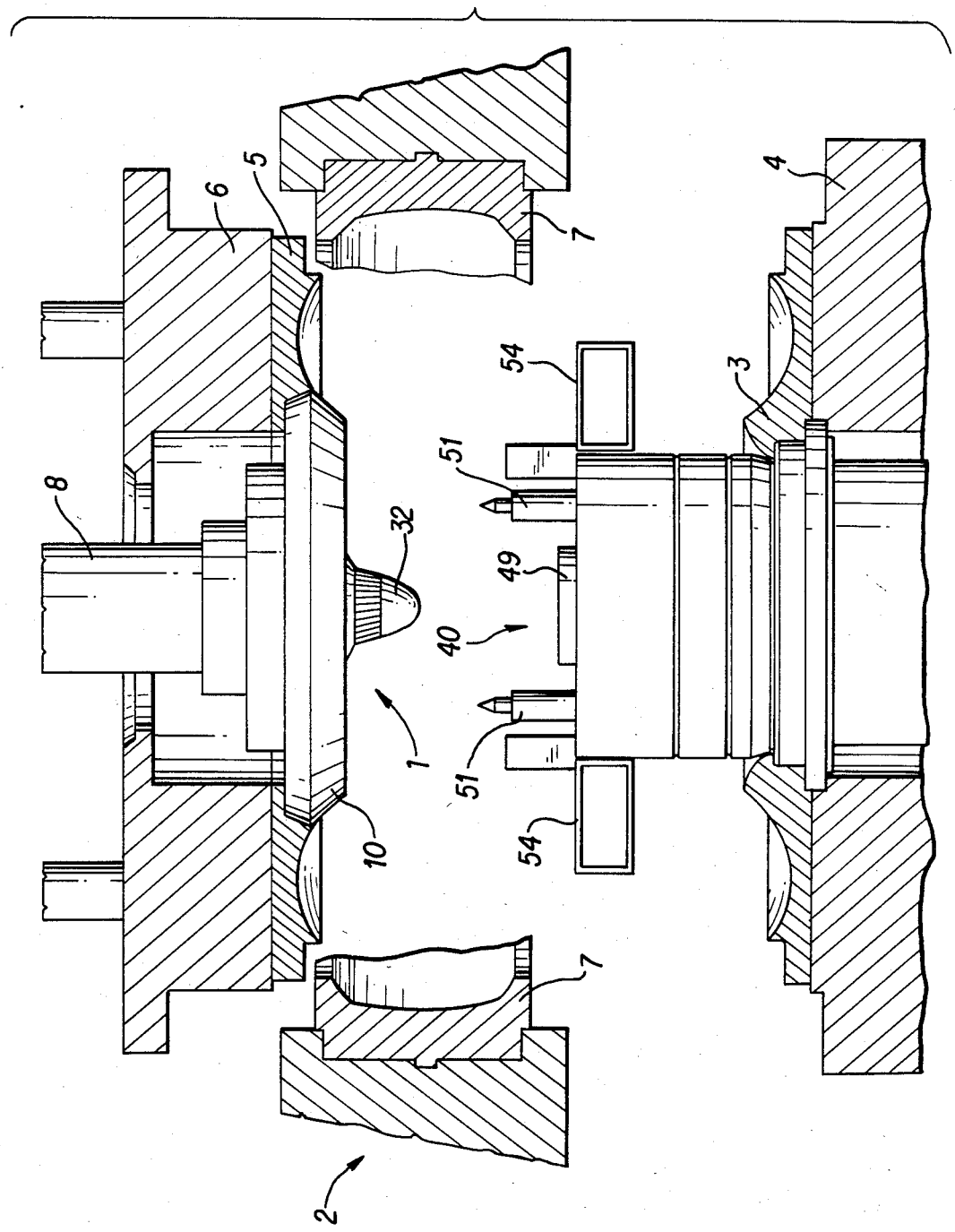
FIG. 1 is a vertical schematic section of a mould for vulcanizing pneumatic tires on which the device of the invention is assembled.

The extractor unit and the device suitable for allowing to rapidly disassemble the driving mechanism of the press, are schematically shown in FIG. 1, which illustrates entirely also the centripetal mould 2 for vulcanizing pneumatic tires. Said mould substantially comprises a lower block 3 secured to a fixed platen 4, that makes part of the frame of a vulcanizing press, and a mobile upper block 5 secured to a mobile platen 6 that makes part of the driving mechanism of the press itself; the shown mould comprises moreover a plurality of sectors 7, each one can be radially moved with respect to the above said block 5 under the drive of an opportune driving mechanism.

The extractor unit 1, as clearly shown in FIG. 1, is substantially housed inside a central opening obtained in the block 5 and is connected to a shaft 8, axially movable with respect to the mould and driven by the press.

Figure 2:
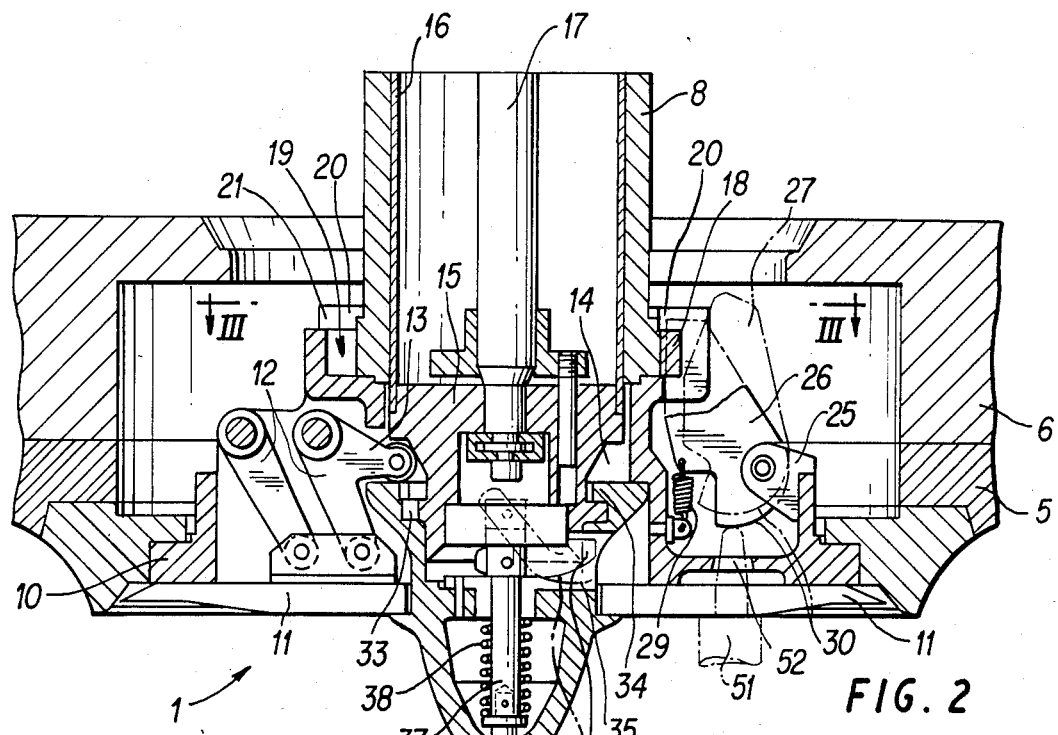
FIG. 2 is a vertical section of the improved centering extractor unit.

The centering extractor unit 1, shown more in detail in FIG. 2, comprises substantially an annular body 10 which is provided with a plurality of extracting laminae 11, radially movable with respect to body 10, to be led from a first configuration in which they are housed substantially inside body 10 to a second configuration (not represented) in which they project from said body so as to impede the separation of the tire bead from the extractor unit; each of laminae 11 is hinged to a pair of levers 12 oscillating on body 10, able to substantially constitute with the relative lamina 11 an articulated quadrilateral; a projection 13 of one of the levers 12 cooperates with an annular groove 14 obtained inside a bushing 15 integral with a tubular element 16 and a rod 17, axially movable inside the shaft 8.

The relative axial movement between the shaft 8 and the tubular element 16 controls the radial movement of the above said laminae 11 with respect to the supporting annular body.

Figure 3:
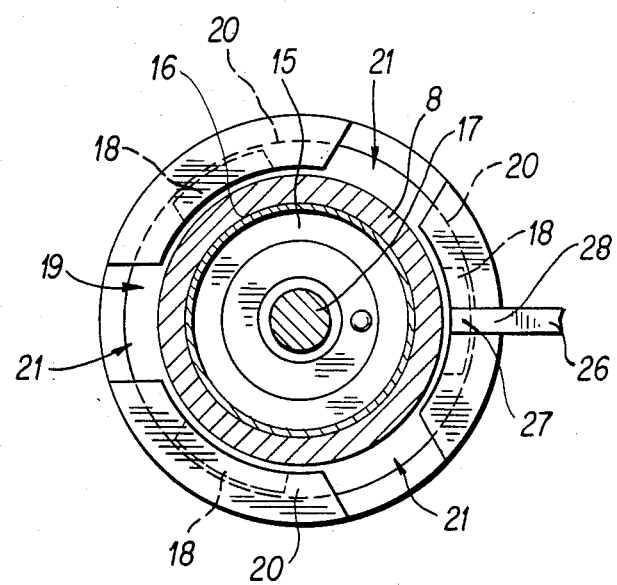
FIG. 3 is a section of the unit of FIG. 2 made with a plane of path III—III.

A first set of radial teeth 18 (in the case of the embodiment shown in FIG. 3 the radial teeth are three) projects from the outer surface of the lower end of the shaft 8; each of said teeth is suitable for being housed in an annular cavity 19 obtained in the upper part of the body 10, as clearly shown in FIG. 2. Said body 10 is then provided with a second set of radial teeth 20, each one is disposed over a corresponding tooth 18 so as to block it inside the cavity 19. Said two sets of teeth 18, 20 constitute the already cited first connecting means. A slot 21 (FIG. 3) is obtained in the body 10 between two contiguous teeth to allow the passage through it of a corresponding tooth 18 to be introduced inside the cavity 19.

An oscillating lever 26 is hinged to a bracket 25 of the body 10 and is substantially disposed in a diametral plane of the body itself, the upper end 27 of the lever is inserted into a corresponding cut 28 obtained in a pair of teeth 18 and 20, so as to impede the relative rotation of the body 10 with respect to the shaft 8 when said teeth are in a position of mutual cooperation. Usually said lever is kept inside the slit due to the action of a helical spring 29, which operates under tension while, a cam-shaped surface 30 is obtained in the lower part of the same to cooperate with corresponding parts of the device as it will be explained later on. Said lever 26 and the corresponding spring 29 constitute the referred embodiment for said first blocking means and the sealing devices connected to these latter.

The extractor unit comprises also an ogive 32 that axially projects downwardly with respect to the body 10 and that is arranged to cooperate with a curing bag (not shown) disposed on the lower part of the press, axially projecting from the lower block 3 of the mould, in order to maintain this bag substantially centered when the bag is inserted into the uncured carcass to be vulcanized, is inflated and when the mould is closed, at the beginning of each new vulcanizing cycle.

Said ogive 32 is secured to the bushing 15 with the same connection as that realized for connecting the body 10 to the shaft 8 and comprising a first set of radial teeth 33 projecting from said bushing 15 and suitable for being inserted into a substantially annular cavity obtained in the ogive 32; a second set of teeth 34 obtained in the upper part of the ogive 32 are superimposed to the teeth 33 to block them inside the above said cavity.

It will be clear that said two sets of teeth constitute a convenient embodiment of said second blocking means.

A pair of radial slit 35 are obtained both in the bushing 15 body, and in the ogive 32 body, are aligned with one another when the teeth of the bushing and those of the ogive are in a position of mutual cooperation and are able to allow the insertion inside them of a bar 36 hinged to a rod 37, axially movable inside the ogive 32 and usually maintained in a first configuration, due to the action of a spring 38 which operates under compression; in the above mentioned configuration, shown in FIG. 2, said rod is in its downward stop position and the bar 36 is substantially orthogonal to said rod and is inserted inside the pair of slits 35 so as to prevent the ogive 32 from substantially rotating with respect to the bushing 15; the rod 37 is led into a hole 37a of the ogive itself. The rod 37 with the bar 36 and the corresponding spring 38 constitute an embodiment preferred by the Applicant for said second blocking means and devices connected to these latter.

The disassembling device according to the invention (FIG. 4) comprises a dragging unit and a support 40 which is disposed over a second shaft 41 that makes part of the vulcanizing press and that passes across a central opening of the lower block 3 of the mould; also said shaft, as the shaft 8, can be axially movable with respect to the press frame.

To disassembling device 40 comprises a supporting platen 42 suitable to be placed on the shaft 41 in a position coaxial with said shaft, and a pair of rotatable discs 43 and 44 which are supported by a pair of rolling bearings 45. The disc 43 is integral with a shaft 46 rotatable on the platen 42 and provided with a head 47, having a central cavity 48, in which a cup-shaped element 49 provided with a stake 49a is axially movable; this cup-shaped element is torsionally integral with the head 47 and usually is maintained in its lifted position, shown in FIG. 4, due to the action of helical springs 50 which operate under compression. The disc 44 is provided with a plurality of stakes 51 disposed on its periphery in such a position as to be able to enter into corresponding holes 52 obtained on the body 10, in consequence of the mutual approaching of the extractor unit to the disassembly device 40. It is better to specify that in the preferred embodiment the states 51 are inserted into the corresponding holes 52 while the laminae 11 are radially projecting from the unit 10, i.e. in such a position as to leave the corresponding holes 52 open, i.e. accessible to the stake 51.

The just cited element (discs, stakes, cup-shaped element) constitute the preferred embodiment for the above mentioned thrusting elements destined to cooperate with the blocking means disposed on the centering extractor unit, as previously described.

The discs 43 and 44 are then provided with holes 53 suitable to receive the end of an opportune operating lever to drive their rotation with respect to the supporting platen 42; the disc 44 is moreover provided with a pair of flanges 54 able to cooperate with an opportune tooling destined to lift the disassembling device 40 for its drawing-away from the press and positioning, with and without the extractor unit.

The disassembling of the extractor unit from the driving mechanism of the press, according to the invention, takes place as follows.

Suppose the last vulcanized pneumatic tire has already been removed from the mould and the mould (and the press) are in the opening position shown in FIGS. 1 and 2.

Figure 4:
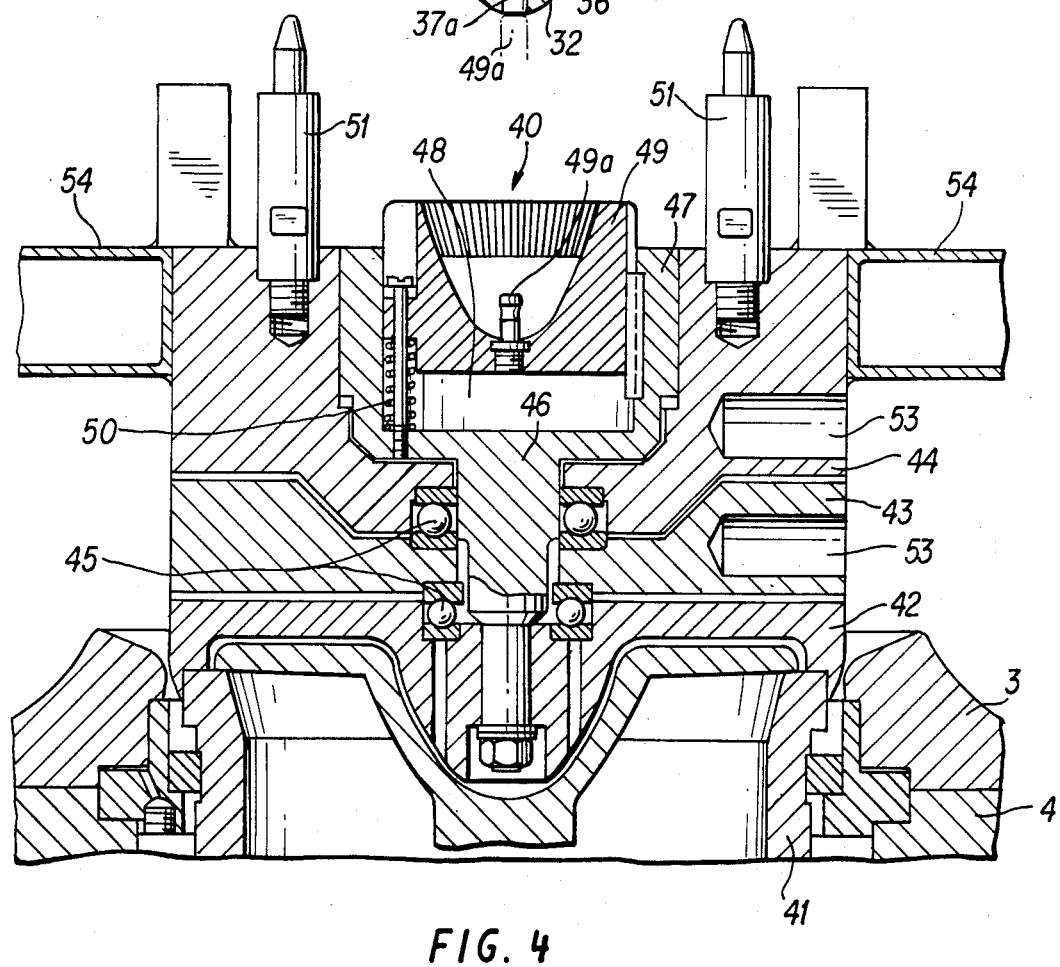
FIG. 4 is a vertical section of the device according to the invention, supported by the lower part of the press, coaxially arranged with said press and said unit.

In order to disassemble the extractor unit, the dragging device 40 is firstly disposed on the lower part of the press and in particular on the shaft 41 as shown in the FIG. 4, after having removed the curing bag.

Subsequently, the shaft 16 is set in action so as to radially extend the laminae 11, the the shaft 41 is driven to move upwardly for lifting said disassembling device (or in alternative the shaft 8 that supports the centering unit is lowered) up to lead the shafts 51 inside the holes 52 of the body 10 and consequently at least one of them into contact with the cam-shaped part 30 of the corresponding flange 26; said movement originates thus a kinematic connection between the cam-shaped profile of the flange and the above stake 51, and consequently the rotation of said flange, against the resistance of the spring 29, around its hinged point, with the result of releasing said flange from the corresponding cut 28. Contemporaneously, the cup-shaped element is advanced into contact with the ogive 32 so as to connect its radially inner surface with the radially outer one of the ogive and to insert the stake 49a into the hole 37a of the ogive itself; said motion drives the upwardly movement of the rod 37, overcoming the elastic reaction of the spring 38. Further to said upwardly movement of the rod 37, the bar 36 rotates and reaches a second configuration shown with a broken line in FIG. 2, where its end substantially comes out of the slits 35, where it was housed, eliminating thus the blocking to the relative rotation between ogive and shaft.

At this stage the rotation of the disc 43 can be driven through an opportune lever inserted inside the relative opening 53; this movement rotates the ogive 132 with respect to the tubular element 16 releasing the teeth 34 from the corresponding teeth 33 of the bushing 15, and consequently separates the ogive 32 from the driving mechanism of the press and places it on the cup-shaped supporting element.

The rotation of the ogive with respect to the bushing 15 is caused by the friction between the radially outer surface of the ogive and the radially inner one of the cup-shaped element or, in alternative, taking advantage of the characteristic of the stake 49a integral with the rotation with said cup.

Now, making the disc 44 rotate, which is driven by an opportune lever too, the body 10 rotates due to the action of the stakes 51, so as to release the radial teeth 20 of the body 10 from the corresponding teeth 18 of the shaft 8, to set said body free from the shaft; in such a manner also the extractor unit is released from the shaft 8 and remains supported by the dragging device 40 and is released from the press by lowering the shaft 41 or, alternatively, by lifting the shaft 8.

The possibility of contemporaneously disassembling the annular body 10 and the ogive 32, through a sole lifting and successive lowering of the shaft 41, or vice versa of the shaft 8, constitutes a great advantage for rapidly carrying out the change of the moulds on the press.

Of course, to assemble a new extractor unit and a new ogive on the press it is necessary to carry out the above described operations in the opposite direction.

Therefore it is evident that by means of the device according to the invention, the operations necessary for disassembling the extractor unit from the shaft 8 and from the other parts of the mould can be carried out in a simple and rapid manner, without particular attention and care by the operator, who effects the operation remaining out of the press body; moreover, it is not necessary to wait for having the various parts of the mould and the press substantially at room temperature since the operations necessary for placing the dragging device 40 over the shaft 41 and for driving the rotation of the discs 43 and 44 can be carried out also when the mould is still hot. This possibility produces a further saving of time as regards the need of leading the new mould to the use temperature before starting the vulcanization of the pneumatic tires.

It is understood that all the various parts of the above described device according to the present invention can be improved without falling out of the field of protection of the invention itself.

We claim:

1. A centering extractor unit for pneumatic tire vulcanizing moulds, suitable to be assembled on and operated by a driving mechanism of a press for vulcanizing pneumatic tires, comprising a body having a substantially annular shape to be connected to a mobile shaft of said driving mechanism, and a plurality of laminae radially movable with respect to said body to be led from a first configuration in which they are housed at an interior region of said body to a second configuration in which they radially project from said body, said connection between the extractor unit and said shaft being effected through first connecting means comprising a first set of radial teeth obtained on said shaft and a second set of radial teeth obtained on said body and able to cooperate with said teeth of the first set to block the body with respect to the shaft in consequence of a relative rotation between said elements, characterized by the fact that said body comprises first blocking means, alternatively and freely movable from a non-interference position to an interference position, simultaneously with both said sets of teeth in position of mutual cooperation.

2. A centering extractor unit according to claim 1, characterized by the fact that said first blocking means comprise at least an oscillating lever which is suitable for being inserted into a corresponding cut obtained in the teeth of said first and second set of teeth to prevent said body from rotating with respect to said shaft, devices being provided for maintaining said lever, freely rotatable around the oscillating center, inside said cut.

3. A centering extractor unit according to claim 2, characterized by the fact that said devices comprise a spring which operates under tension to maintain said lever inside said cut.

4. A centering extractor unit according to claim 2, characterized by the fact that said oscillating lever has a cam-shaped profile for the kinematic connection with a thrusting means suitable to overcome the resistance of said spring, originating the rotation of said oscillating lever around its oscillating center and the escape of said oscillating lever from said cut.

5. A centering extractor unit according to claim 1, characterized by the fact of comprising means for the connection with a device rotating around the axis of said annular body, to originate the movement of said blocking means in said non-interference position and the rotation of said body around said shaft.

6. A centering extractor unit according to claim 5, characterized by the fact that said connecting means comprise at least one hole with axial arrangement obtained in said annular body in correspondence of a lever, said hole being to receive and lead said thrusting means against said cam-shaped profile.

7. A centering extractor unit for pneumatic tire vulcanizing moulds, suitable to be assembled on and operated by the driving mechanism of a press for vulcanizing pneumatic tires, comprising a body, a centering ogive axially projecting from said body and connected to a mobile shaft of said driving mechanism through a connecting means comprising a first set of radial teeth obtained on said mobile shaft and a second set of radial teeth obtained on said ogive and able to cooperate with said teeth of the first set to block the ogive with respect to the mobile shaft in consequence of a rotation of the ogive with respect to the mobile shaft, characterized by the fact of comprising a blocking means alternatively and freely movable from a non-interference position to an interference position simultaneously with said mobile shaft and said ogive, disposed with said sets of teeth in position of mutual cooperation.

8. A centering extractor unit according to claim 7, characterized by the fact that said mobile shaft and said ogive comprise a pair of slits, said blocking means comprise a rod axially movable inside said ogive, a bar hinged to said rod for being inserted into said pair of slits obtained on said mobile shaft and on said ogive to prevent said ogive from rotating with respect to said mobile shaft, devices being provided to maintain said bar freely rotatable around a hinged point with said rod inside said slits.

9. A centering extractor unit according to claim 8, characterized by the fact that said devices comprise a spring which acts on said rod and operates under compression for maintaining said bar inside said slits.

10. A centering extractor unit according to claim 7, characterized by the fact of comprising means for connecting with a device rotating around the axis of said ogive provided with a thrusting means to exercise a thrust on said blocking means giving rise to the movement of said blocking means in a non-interference position and to originate the rotation of said ogive around said mobile shaft.

11. A centering extractor unit according to claim 10, characterized by the fact that said last named connecting means comprise an axial hole obtained in the body of said ogive in correspondence of said rod, to receive and lead said thrusting means against said rod.

12. A device for assembling and disassembling said centering extractor unit for said pneumatic tire vulcanizing moulds, respectively on and from the driving mechanism of a press for vulcanizing pneumatic tires, according to claim 1, characterized by the fact that said press comprises a frame and said device further comprises a platen supported by the frame of said press in correspondence of a lower portion of a said mould, coaxially with said press, a first disc axially and freely rotatable with respect to said platen, comprising means for associating with said annular body able to exercise a thrust on said first blocking means to lead them in said non-interference position, and means able to originate the rotation of said annular body around its own axis, a second disc axially and freely rotatable around said platen and said first disc comprising means for connecting with said centering ogive able to exericse a thrust on a second blocking means to lead them in a non-interference position, and means able to originate the rotation of said ogive around its own axis.

13. A device according to claim 12, characterized by the fact that said means for connecting with said annular body disposed on said first disc comprise at least a stake, projecting from said disc in axial direction toward the upper part of the mould, to be inserted, in consequence of a relative axial movement of mutual approaching between said device and said centering extractor unit, into a corresponding hole obtained in said annular body and to exercise a thrust on said lever, against the action of said spring through the kinematic connection with the cam-shaped profile of said lever, to cause the rotation of said lever around its oscillating center and its coming out of said cuts.

14. Device according to claim 12, characterized by the fact that said means for connecting with said centering ogive on said second disc comprise a cup-shaped element, whose radially inner surface corresponds substantially to the radially outer surface of said ogive, axially and freely movable with respect to said second disc, but integral with the rotation of the disc itself, means being provided to maintain said cup-shaped element usually projecting axially from said device toward said extractor unit.

15. Device according to claim 14, characterized by the fact that said cup-shaped element is supported by a central pin, coaxially disposed with said centering extractor unit in operating position, inserted in axial holes obtained on said platen and said disc, axially freely rotatable with respect to said platen and said first disc, integral with the rotation with respect to said second disc.

16. A device according to claim 14, characterized by the fact that said means for maintaining said cup-shaped element usually projecting axially from said device comprise springs that operate under compression.

17. A device according to claim 14, characterized by the fact that said cup-shaped element is provided with a stake in axial position, integral with said cup-element, turned toward said ogive to be inserted, in consequence of a relative axial movement of mutual approaching between said cup-shaped element and said ogive, into a corresponding axial hole obtained in said ogive body in correspondence of said rod and to exercise a thrust on said rod, against the action of said spring, causing the rotation of said bar around its hinged point and its coming out of said slits.

* * * * *